(12) United States Patent
Li et al.

(10) Patent No.: US 9,125,247 B2
(45) Date of Patent: Sep. 1, 2015

(54) ELECTRICAL CONNECTIONS FOR FILM INSERT MOLDED WINDOWS

(75) Inventors: Chengtao Li, Novi, MI (US); Juan Velasquez, Clarkson, MI (US); Todd Adkins, Commerce, MI (US); Keith D. Weiss, Fenton, MI (US); Yana Shvartsman, Southfield, MI (US)

(73) Assignee: EXATEC LLC, Wixom, MI (US)

( * ) Notice: Subject to any disclaimer, the term of this patent is extended or adjusted under 35 U.S.C. 154(b) by 1461 days.

(21) Appl. No.: 12/113,687

(22) Filed: May 1, 2008

(65) Prior Publication Data

US 2008/0274652 A1    Nov. 6, 2008

Related U.S. Application Data (60) Provisional application No. 60/915,260, filed on May 1, 2007.

(51) Int. Cl.
 *B60L 1/02* (2006.01)
 *H05B 3/86* (2006.01)
 *B29C 45/14* (2006.01)

(52) U.S. Cl.
 CPC ............ *H05B 3/86* (2013.01); *B29C 45/14811* (2013.01); *B29C 2045/14901* (2013.01); *B29K 2995/0005* (2013.01); *H05B 2203/017* (2013.01)

(58) Field of Classification Search
 USPC .......................................... 219/203, 202, 522
 See application file for complete search history.

(56) References Cited

U.S. PATENT DOCUMENTS

| | | | | |
|---|---|---|---|---|
| 4,078,107 A * | 3/1978 | Bitterice et al. | | 428/38 |
| 4,396,826 A * | 8/1983 | Orcutt et al. | | 219/522 |
| 4,878,850 A | 11/1989 | Letemps et al. | | |
| 4,883,940 A * | 11/1989 | Tokarz | | 219/203 |
| 5,023,403 A * | 6/1991 | Eckardt et al. | | 174/94 R |
| 5,624,591 A * | 4/1997 | Di Trapani | | 219/522 |
| 6,024,904 A | 2/2000 | Nanri | | |
| 6,051,820 A * | 4/2000 | Poix et al. | | 219/522 |
| 6,103,999 A | 8/2000 | Nishio et al. | | |
| 2003/0042239 A1 * | 3/2003 | Sol | | 219/203 |
| 2004/0265512 A1 | 12/2004 | Aengenheyster et al. | | |

FOREIGN PATENT DOCUMENTS

| | | |
|---|---|---|
| DE | 10016346 A1 | 10/2000 |
| JP | S46003655 A | 11/1971 |

(Continued)

OTHER PUBLICATIONS

International Search Report—PCT/US2008/062255 (Aug. 20, 2008).

(Continued)

*Primary Examiner* — Dana Ross
*Assistant Examiner* — Lindsey C Teaters
(74) *Attorney, Agent, or Firm* — Cantor Colburn LLP (57) ABSTRACT

A plastic window including a transparent plastic substrate having first and second sides. Bonded to the first side of the substrate is a plastic film, the film being thinner than the substrate. An electrically conductive grid, including at least one conductive connector location, is encapsulated between the substrate and the film. Extending into the substrate, at least one electrical connector is positioned in electrical contact with the conductive mounting so that an electrical voltage supply can be connected to the conductive mounting and an electrical current can be caused to flow through the conductive grid.

16 Claims, 4 Drawing Sheets

(56) References Cited

FOREIGN PATENT DOCUMENTS

| JP | 2009620 A | 1/1990 |
|---|---|---|
| JP | 8099610 A | 4/1996 |
| JP | 2002331919 A | 11/2002 |

OTHER PUBLICATIONS

Japanese Patent No. 2002331919 (A); Publication Date: Nov. 19, 2002; Abstract Only; 1 Page.
Japanese Patent No. 2009620 (A); Publication Date: Jan. 12, 1990; Abstract Only; 1 Page.
Japanese Patent No. 8099610 (A); Publication Date: Apr. 16, 1996; Abstract Only; 1 Page.
International Preliminary Report on Patentability; International Application No. PCT/US2008/062255; International Filing Date: May 1, 2008; Date of Completion: Jul. 16, 2009; 13 Pages.
Japanese Patent No. S46003655 (A); Publication Date: Nov. 4, 1971; Machine Translation; 5 Pages.

* cited by examiner

ELECTRICAL CONNECTIONS FOR FILM INSERT MOLDED WINDOWS

CROSS REFERENCE TO RELATED APPLICATION

This invention claim the benefit of U.S. provisional application No. 60/915,260, filed May 1, 2007, the entire contents of which are herein incorporated by reference.

BACKGROUND

1. Field of the Invention

The present invention generally relates to the connection of electrical terminals to plastic panels having electrically conductive grids, traces or circuits thereon, hereinafter just "grids". More specifically, the present invention relates to the attachment of electrical terminals to an electrical grid applied to a plastic substrate of a plastic window system via film insert molding in order to provide a functional capability to the window system, such as defrosting and defogging capabilities.

2. Description of the Related Technology

Electrically conductive grids have long been used for providing functional capabilities to window systems, such as the defrosting and defogging of windows, particularly the backlights of automobiles. In an electrically heated backlight for example, an electrically conductive heating grid is typically located toward either the interior or exterior side of the window. The heating grid also typically includes a pair of opposed busbars, between which a series of grid lines extend. During the passing of electric current through the heating grid, the resistance of the grid lines results in the generation of heat, and this heat dissipates across the window, subsequently defrosting or defogging of the window. In order to provide electricity to the heating grid, the heating grid is coupled to the electrical system of the automotive vehicle.

To achieve coupling of the automotive vehicle's electrical system to the heating grid, the busbars of the heating grid have been formed with foil tabs that extend beyond the edges of the window. Wire harness terminals, from the vehicle's electrical system, engage the tabs. The terminals can be of a variety of constructions, but often include a spring metal contact, encased within a housing. When the housing is attached to a tab, the contact is biased into contact with the busbar. In an alternate construction, bonding pads are integrally formed or attached to the busbars and terminals from the vehicle's electrical system are soldered to the bonding pads.

In another alternate construction, the heating grid is applied to the substrate of the window by way of a film insert molding (FIM), which is sometimes also referred to as in-mold decorating (IMD). It is to these techniques that the present invention is particularly directed. With FIM, the heating grid is printed onto a flexible, thin plastic sheet, herein referred to as a film. The film is shaped so as to correspond to the shape of a cavity surface of the mold in which the plastic panel is to be formed. The film is placed in the mold and on the corresponding surface of the mold cavity such that the heating grid is toward the interior of the mold cavity. Thereafter, the mold is closed and the plastic resin for the substrate of the panel is injected into the mold, back filling the film and forming the panel with the plastic film adhered thereto. As a result, the heating grid is encapsulated in the panel between the film and the substrate. Once the panel is sufficiently cooled, the mold is opened and the panel, with the film and integrated heating grid, removed from the mold.

Each of the above constructions has its known problems and limitations. Illustrative of the limitations of the spring contacts is that over the life of the vehicle, the spring contacts may become loose, due to fatigue and/or vibration, resulting in a non-working or a poorly working heating grid. With regard to the limitations of a pad bonding construction, the application of too much or too little solder weakens the joint between the terminals and the bonding pad, which may result in the terminal being easily dislodged from the bonding pad itself. Due to the low glass transition temperature of plastics, traditional high temperature solder cannot be used to make robust connections to the busbars. Unfortunately, the commercially available low temperature solders, and even, electrically conductive adhesives, have unacceptable bonding strengths and or reliability.

Regarding heating grids applied via FIM, after molding, the heating grid are encapsulated between the film and plastic substrate of the panel. In order for the heating grid to function, the heating grid must connect to the electrical system of the vehicle, and more particularly, with an electrical terminal of that system. In view of the above, it is apparent that improved connection constructions for attaching terminals to the busbars of FIM conductive grids of plastic window systems are required.

SUMMARY

In satisfying the above need, as well as overcoming the enumerated drawbacks and other limitations of the related art, the present invention resolves the connection problem of FIM conductive grids by providing a plastic window having a transparent plastic substrate with first and second sides. Bonded to the first side of the substrate is a plastic film, the film being thinner than the substrate. An electrically conductive grid, including at least one conductive connector location, is encapsulated between the substrate and the film. Extending into the substrate, at least one electrical connector is positioned in electrical contact with the conductive connector location so that an electrical voltage supply can be connected to the conductive connector location and an electrical current can be caused to flow through the conductive grid.

In another aspect of the invention, the bond between the substrate and the film is a melt bond.

In another aspect of the invention, the electrical connector extends in a bore formed in the substrate.

In another aspect of the invention, the electrical connector is in contact with portions of the substrate defining the bore.

In another aspect of the invention, the electrical connector is not in contact with portion of the substrate defining the bore.

In another aspect of the invention, the electrical connector is in threaded engagement with the bore.

In another aspect of the invention, the electrical connector is at least partially encapsulated by the substrate and mechanically retained therein.

In another aspect of the invention, the conductive grid is one of an antenna, an electroluminescent border, an electrical switch, a heating grid and chromogenic device, such as electrochromic devices, photochromic devices, liquid crystal devices, user-controllable-photochromic devices, polymer-dispersed-liquid-crystal devices, and suspended particle devices commonly known in the art.

In another aspect of the invention, the electrical connector is a threaded metal insert molded into the plastic substrate and being in contact with the conductive connector location.

In another aspect of the invention, the electrical connector is a metal disc attached to the conductive connector location, the disc being partially exposed through an opening in the substrate.

In another aspect of the invention, the disc includes an electric terminal mounting feature.

In another aspect of the invention, the bottom surface of the disc is in contact with the conductive connector location, and may have a knurled surface.

In another aspect of the invention, the mounting feature is a bent tab defined in the disc.

In another aspect of the invention, a protective coating is applied to the substrate and film, the protective coating system comprises at least one of a weather resistant layer and an abrasion resistant layer.

In another aspect of the invention, the film is a thin plastic sheet.

In a further aspect of the invention, a method of manufacturing a plastic window comprises the steps of: providing a thin flexible plastic film having a first surface and a second surface; forming an electrically conductive grid on the first surface of the film, the conductive grid including at least one conductive connector location; securing the film onto a cavity surface of a mold, the cavity surface partially defining a cavity in the mold in the shape of the window, the second surface of the film being in contact with the cavity surface; closing the mold such that the film is retained within the cavity; injecting a plastic resin into the cavity between the mold and the first surface of the film to define a substrate; melt bonded to the first side of the film to the substrate such that the conductive grid is encapsulated between the film and the substrate; providing an electrical connector extending into the substrate and into electrical contact with the conductive connector location whereby an electrical voltage supply can be connected to the conductive connector location and whereby an electrical current can be caused to flow through the conductive grid.

In another aspect of the invention, the method further comprises the steps of forming at least one bore through the substrate to the conductive connector location, the electrical connector being provided so as to extend into the bore.

In another aspect of the invention, the bore is formed by machining away a portion of the substrate immediately adjacent to the conductive connector location.

In another aspect of the invention, the bore is formed by molding the substrate about pins extending from a portion of the mold located opposite of the film.

In another aspect of the invention, the method includes the step of closing the mold and contacting the pins with the conductive connector location prior to the injecting of the plastic resin into the cavity.

In another aspect of the invention, upon the closing of the mold, the pins are at least partially retracted into the portion of the mold supporting the pins.

In another aspect of the invention, the pins are biased toward a position extending from the portion of the mold supporting the pins.

In another aspect of the invention, the electrical connector is ultrasonically inserted into the bore.

In another aspect of the invention, the electrical connector is heat inserted into the bore.

Further objects, features and advantages of this invention will become readily apparent to persons skilled in the art after a review of the following description, with reference to the drawings and claims that are appended to and form a part of this specification.

DETAILED DESCRIPTION

The following description of the preferred embodiments is merely exemplary in nature and is in no way intended to limit the scope of the invention or its application or uses.

Figure 1:
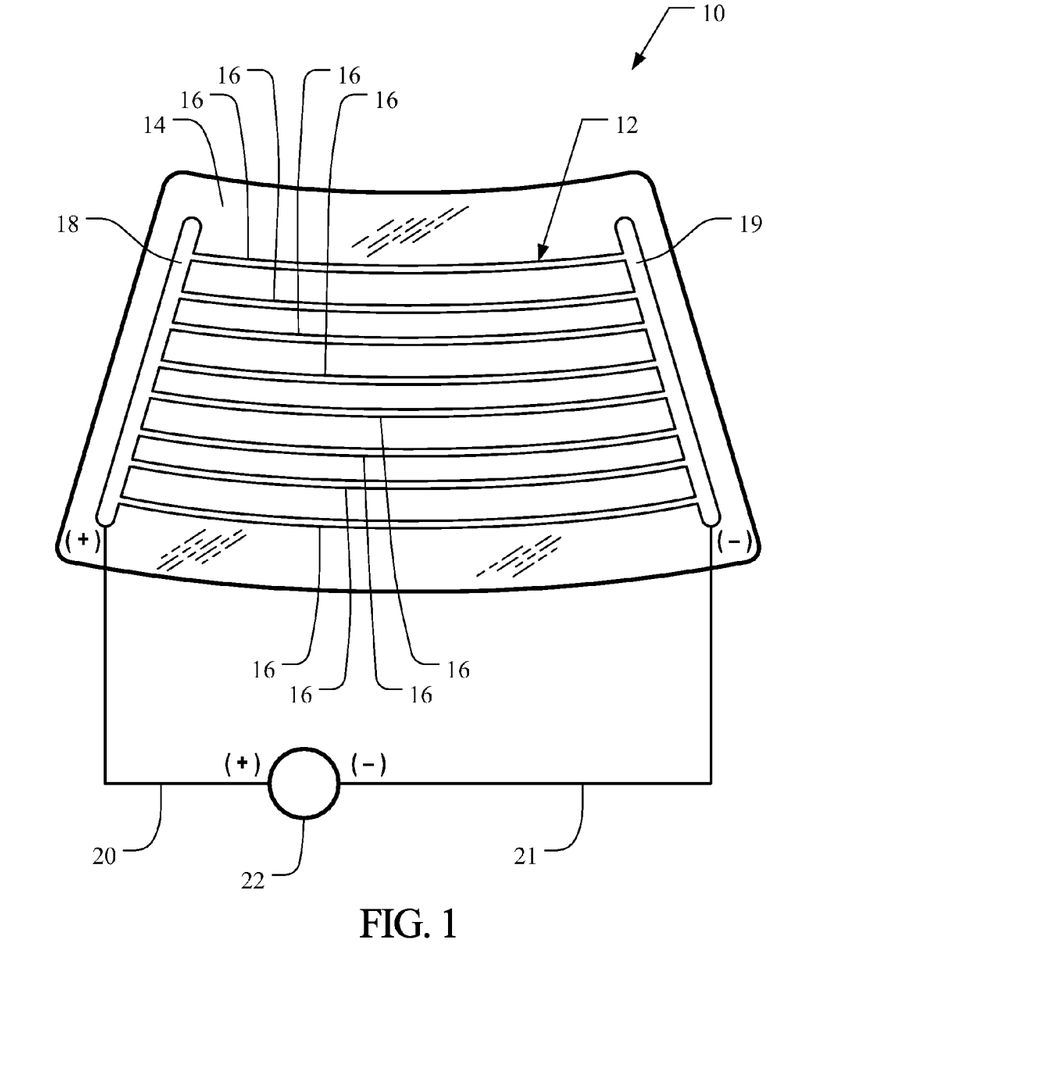
FIG. 1 is a diagrammatic view of a plastic window embodying the principles of the present invention.

Referring now to FIG. 1, a plastic window system 10 is generally illustrated therein and includes, as its primary components, an electrically conductive grid 12 incorporated into a panel 14. While the conductive grid 12 may be one of a variety of elements providing functionality to the window system, the conductive grid 12 will be herein further described and referred to as a heating grid 12.

The heating grid 12 preferably includes a series of grid lines 16, extending between generally opposed busbars 18, 19, although other constructions of heating grids may be employed. Furthermore, at least some of the grid lines 16 may be replaced by a conductive coating extending between the remaining grid lines 16.

The busbars 18, 19 are designated as positive and negative busbars and are respectively connected to positive and negative leads 20, 21 of a power supply 22, which may be part of an electrical system of an automotive vehicle. Upon the application of a voltage to the heating grid 12, electric current will flow through the grid lines 16 from the positive busbar 18 to the negative busbar 19 and, as a result, the grid lines 16 will heat up via resistive heating. The widths and lengths of the bus bars 18, 19 and grid lines 16 may be of any suitable dimension and will, in part, be determined by the size and other characteristics of the window system 10.

Figure 2:
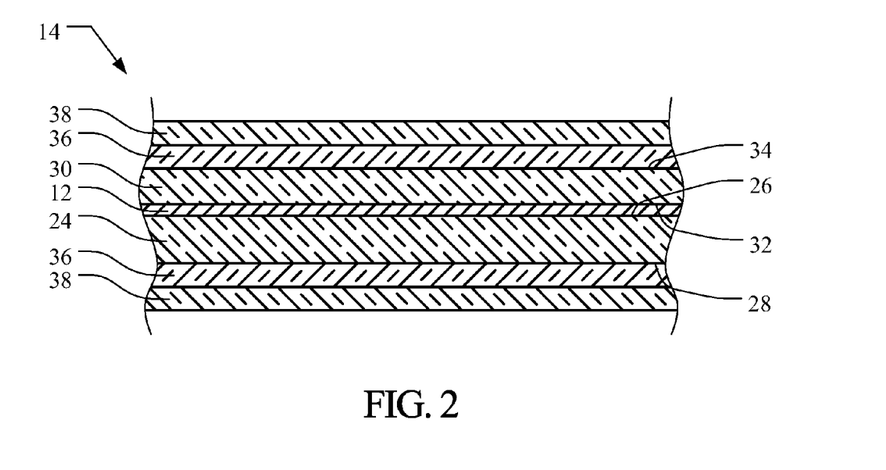
FIG. 2 is a partial sectional view of the plastic window seen in FIG. 1.

The panel 14 more specifically includes, as seen in FIG. 2, a transparent plastic base layer or substrate 24 having opposing first and a second surfaces, respectively designated at 26 and 28. These surfaces are respectively oriented with respect to the interior and exterior side surfaces of a window incorporated into an automotive vehicle. The panel 14 further includes a transparent, plastic film 30 having a first surface 32 and a second surface 34. The heating grid 12 is provided on the first surface 32 of the film 30. In the final construction of the panel 14, the first surface 26 of the substrate 24 and the first surface 32 of the film 30 are integrally melt bonded together so as to encapsulate the heating grid 12 between the substrate 24 and the film 30. The panel 14 may further include a weathering layer 36 and/or an abrasion resistant layer 38, applied to one or both sides thereof.

The substrate 24 and film 30 are formed of a plastic resin, which may be, but is not limited to, polycarbonate, acrylic, polyarylate, polyester and polysulfone resins, as well as copolymers and mixtures thereof. The substrate 24 and film 30 may further include various additives, such as colorants, mold release agents, antioxidants, and ultraviolet absorbers (UVAs), among others.

The thickness of the film 30 may vary depending on the particular design. However, the thickness is preferred to be between about 0.05 to 2 mm, with about 0.5 mm being more preferred. The thickness of the substrate 24 is preferably about 2 mm to about 5 mm, with about 3 mm to about 4 mm being more preferred. Overall, the thickness of the window system 10, including both the film 30 and the substrate 24 melt bonded together, is preferably about 3 mm to 6 mm, with between about 4 mm and 5 mm being more preferred.

The heating grid 12 on the first surface 32 of the film 30 is formed of a conductive ink applied onto the first surface 32 via screen printing, although other methods of printing known to those skilled in the art are acceptable. Such other methods include, but are not limited to mask/spray, ink-jet, pad, membrane image transfer or robotic printing. Material for the conductive ink is well known in the art.

After the first surfaces 26, 32 of both the film 30 and substrate 24 are melt bonded together, the resulting plastic panel 14 is typically coated to form a weathering layer 36 and an abrasion resistant layer 38 thereon. The weathering layer is typically applied to the second surface 34 of the film 30. However, the weathering layer 34 may also be applied to the second surface 28 of the substrate 24. The abrasion resistant layer 38 is typically applied to the second surface 28, 34 of both the substrate 24 and the film 30.

While other coating systems may be used, the weathering layer 36 preferably comprises either a polyurethane coating or a combination of an acrylic primer and a silicone hard-coat. An example of such an acrylic primer is Exatec® SHP 9X (Exatec, LLC, Wixom, Mich.). Typically, the primer is coated on the transparent plastic panel, air dried, and then thermally cured. A silicone hard-coat is applied over the primer layer and is air dried before being curried. The resin in the silicone hard-coat is preferably a methylsilsesquioxane resin dispersed in a mixture of alcohol solvents. The silicone hard-coat may also comprise other additives, such as but not limited to surfactants, antioxidants, biocides, ultraviolet absorbers, and drying agents, among others. A preferred silicone hard-coat is Exatec® SHX (Exatec, LLC, Wixom, Mich.). The primer of the weathering layer is a waterborne acrylic primer comprising water as the first co-solvent and an organic liquid as a second co-solvent. The general chemical classes associated with the second co-solvent present in the primer/hard-coat system include glycol ethers, ketones, alcohols and acetates. The acrylic resin may be present as a water soluble, dispersible, or reducible resin. The primer may contain other additives, such as, but not limited to, surfactants, antioxidants, biocides, ultraviolet absorbers (UVAs), and drying agents, among others.

The weathering layer 36 may be applied to the transparent plastic panel by dipping the panel in the coating at room temperature and atmospheric pressure in a process known in the art as dip coating. Alternatively, the weathering layer may be applied by flow coating, curtain coating, spray coating, or other processes known to those skilled in the art.

The abrasion resistant layer 38 is a substantially inorganic coating that adds additional or enhanced functionality to the automotive decorative glazing assembly by improving abrasion resistance. The abrasion resistance layer 38 preferably is applied on top of the weathering layer 36 and to both the second surfaces 28 of the substrate 24 and the second surface 34 of the film 30, where the weathering layer 36 may be absent from the second surface 28 of the substrate 24. Accordingly, the abrasion resistant layer 38 may be deposited directly onto the second surface 28 of the substrate 24. Specific examples of possible inorganic coatings for the abrasion resistant layer 38 include, but are not limited to, aluminum oxide, barium fluoride, boron nitride, hafnium oxide, lanthanum fluoride, magnesium fluoride, magnesium oxide, scandium oxide, silicon monoxide, silicon dioxide, silicon nitride, silicon oxy-nitride, silicon oxy-carbide, silicon carbide, hydrogenated silicon oxy-carbide, tantalum oxide, titanium oxide, tin oxide, indium tin oxide, yttrium oxide, zinc oxide, zinc selenide, zinc sulfide, zirconium oxide, zirconium titanate, or glass, and mixtures or blends thereof.

The abrasion resistant layer 38 may be applied by any technique known to those skilled in the art. These techniques include deposition from reactive species, such as those employed in vacuum-assisted deposition processes, and atmospheric coating processes, such as those used to apply sol-gel coatings to substrates. Examples of vacuum-assisted deposition processes include, but not limited to, plasma enhanced chemical vapor deposition (PECVD), arc-PECVD, ion assisted plasma deposition, magnetron sputtering, electron beam evaporation, and ion beam sputtering. Examples of atmospheric coating processes include, but are not limited to, curtain coating, spray coating, spin coating, dip coating, and flow coating.

In the present invention, the window system is prepared by FIM. In its most elementary form, FIM uses a thin, flexible plastic film 30, with a functional element, such as the heating grid 12, printed onto the first surface 32 of the film 30. The printed film 30 is then formed into the required shape.

Shaping of the film 30 can be performed by a variety of techniques including vacuum forming (thermoforming), pressure forming, or hydroforming. Generally, as is the case of thermoforming, the film 30 is heated using a bank of ceramic heating elements positioned over the film. The film is thereafter clamped above a tool resembling the shape of the desired finished panel or window. The tool is raised from beneath and, when an airtight seal is achieved, the applied vacuum draws the softened film over the tool. Provided that forming is carried out soon after curing the heating grid 12, there may be no need to pre-dry the film. However, pre-drying the film may be necessary for thick (greater than about 375 µm or 0.015") films, even immediately after curing of the conductive grid 12. In that shaping of plastic films is well known, this process is not illustrated in the drawings.

After shaping, if desired, the film 30 is trimmed to the desired size. The film is then placed into an injection mold cavity and onto a surface defining the cavity, with the second surface 34 of the film 30 in contact with the mold's surface. Thus, the first surface 32 and the heating grid 12 are facing the interior of the cavity. The film 30 may be held to the surface of the mold by vacuum or any other means known to those skilled in the art of FIM. After closing of the mold halves, the molten resin that forms the substrate 24 is injected into the mold cavity, backfilling onto the first surface 32 of the film 30. Upon contact between the hot resin and the cool film 30, melt bonding between the film 30 and the substrate 24 occurs. The film 30 therefore becomes an integral part of the panel 14. Due to the conductive grid being encapsulated between the substrate 24 and film 30, panels 14 manufactured in this manner exhibit enhanced scratch, solvent, abrasion, and chemical resistance with regard to their heating grids 12.

However, the problem remains in how to connect the electrical system of the vehicle with the encapsulated heating grid 12 of the window system 10.

Several methods for solving the connection problem are proposed herein. One method involves post-molding insertion of an electrical connector into the panel 14. Another method involves insert molding the electrical connector into the panel 14.

Figure 3A:
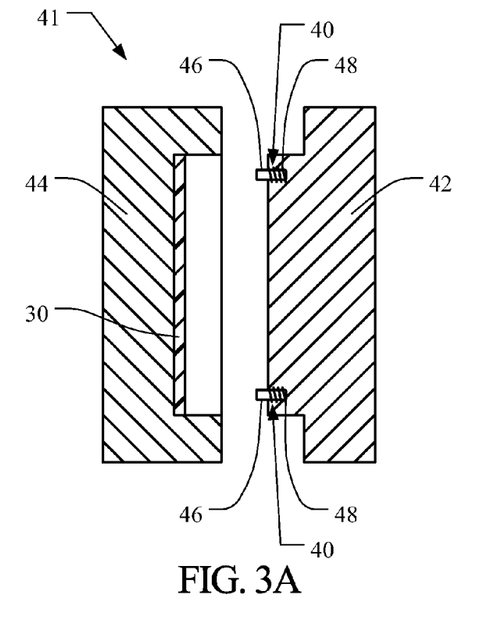
FIG. 3A is a schematic illustration of a mold for molding the plastic window in accordance with the principles of the present invention.
Figure 3B:
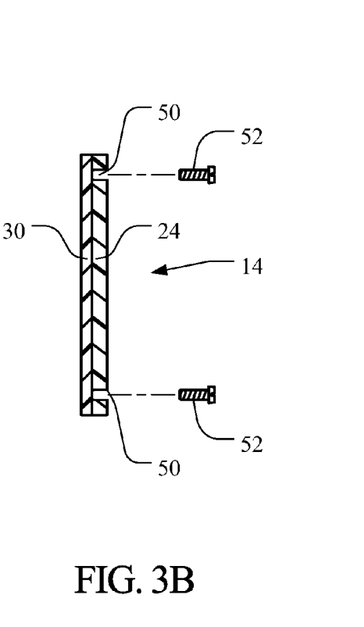
FIG. 3B is a schematic, sectional illustration of the plastic window molded in FIG. 3A.

Referring now to FIGS. 3A and 3B, according to one embodiment of the present invention, spring loaded pins 40 are provided on the mold half 42 (i.e. core side) located opposite to the mold half 44 (i.e. cavity side) where the film 30 is secured to the cavity surface of the mold 41. Upon closing of the mold 41, the tips of the pins 40 contact the busbars 18, 19 of the heating grid 12. The tips of the pins 40 are preferably made of an elastic, resilient material, such as polyurethane (PU) foam or rubber, so as to avoid scratching the heating grid 12 during high pressure molding. The contact of the pins 46 with the busbar 18, 19 is preferably precisely controlled with a tight tolerance through the selection of a spring 48 having an appropriate spring rate. As will be readily appreciated, the spring 48 biases the pin 46 toward the opposing mold half 44 and thus controls the pressure exerted by the spring on the heating grid 12 and the film 30. In this way, a gap is not permitted to develop between the pin 46 and the busbar 18, 19, thereby, avoiding the flashing of any plastic between the pin 46 and the busbar 18, 19. The pins 46, however, should not press too hard against the film 30 because such force could leave a distortion or a mark on the film 30, or actually break contact between the film 30 and the busbar 18, 19. Upon opening of the mold 41 and removal of the panel 14 therefrom, the pins 46 are retracted out of the formed panel 14

As a result of the pins 18, 19, bores 50 will be formed in the molded panel 14. As seen in FIG. 3, utilizing the bores 50, electrical connectors 52 are inserted or screwed into the bores 50, or alternatively ultrasonically inserted or thermally inserted into the bores 50. During ultrasonic insertion, the connectors are placed on top of the bore (sized slightly smaller than the connector) and are ultrasonically excited by a sonotrode or horn of an ultrasonic welder. This generates frictional heat at the interface between the connector and the bore. As a result, the connector melts its way into the bore. When the connector engages the busbar, the ultrasonic excitation is stopped, the melt solidifies and secures the connector. This insertion process may be used with or without threaded connector. Thermal or heat insertion uses equipment that heats up the connector and then pushes it into the bore. The heating is typically done by contact (a heated tip that holds the insert/connector) or induction. Preferably, the connectors 52 are dimensioned such that upon full insertion of the connectors 52 into the bores 50, the connectors 52 make sufficient electrical contact with the busbars 18, 19, without damaging the busbars 18, 19 or stressing the substrate 24 or film 30.

Figures 4A, 4B:
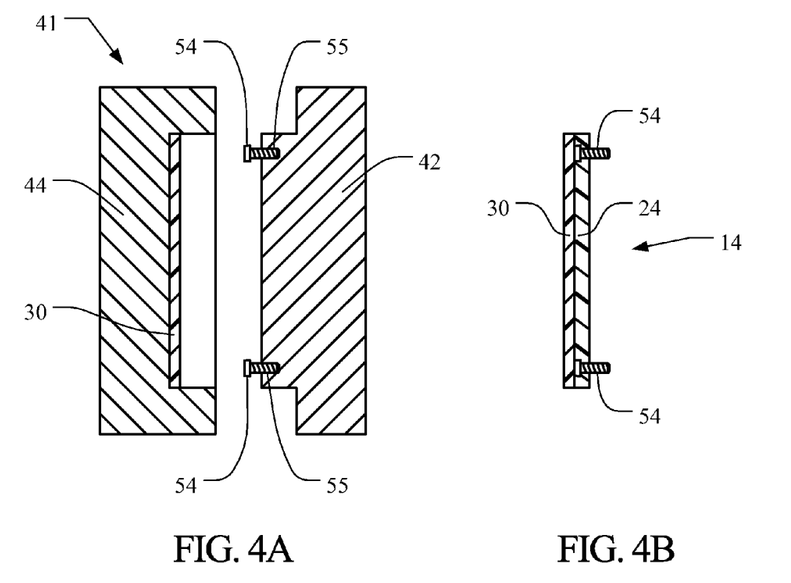
FIG. 4A is a schematic illustration of a mold for molding another plastic window in accordance with the principles of the present invention.
FIG. 4B is a schematic, sectional illustration of the plastic window molded in FIG. 4A.

In an alternative embodiment of the present invention (shown in FIG. 4A), connector inserts 54 (preferably made of brass, copper or steel) are mounted on the mold half 42 (i.e., core side) opposite to the mold half 44 (i.e., cavity side) supporting the film 30. The inserts 54 are retained by the mold half 42 so as to be molded into substrate 24 during FIM of the film 30 into the panel 14. Upon closing of the two mold halves 42, 44, the connector inserts 54 are brought into contact with the busbars 18, 19 on the film 30. As with the prior method, contact with the busbars 18, 19 is controlled to prevent damage to the busbars 18, 19, the film 30 or the connection between the two. Also contact with the busbars 18, 19 by the connector inserts 54 should be sufficient to avoid flashing of injected plastic between the busbars 18, 19 and the connector inserts 54. The plastic resin for the substrate 24 is then injected between the film 30 and mold half 42. The result is a panel 14 with the FIM heating grid 12 being encapsulated between the film 30 and the substrate 24 and with the connector inserts 54 encapsulated by the substrate 24, as seen in FIG. 4B.

Figure 5:
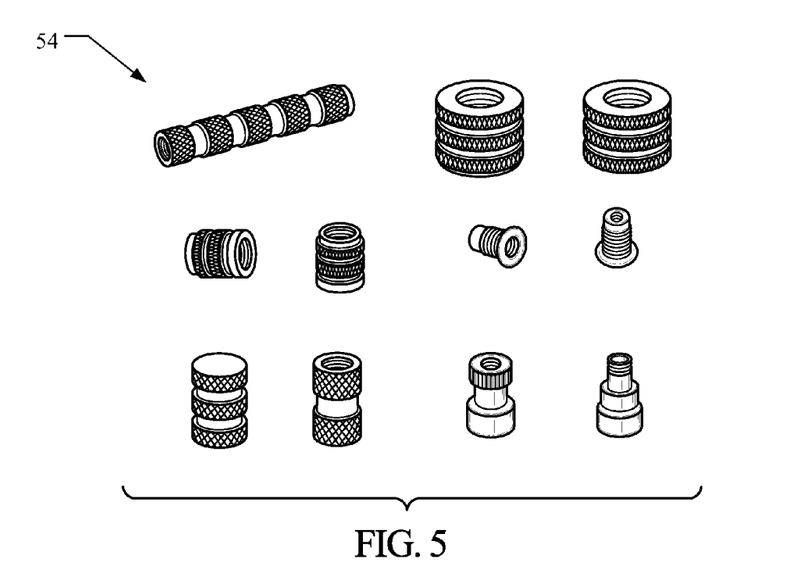
FIG. 5 illustrates representative connectors as may be employed in the present invention.

Generally, the manufacturing steps of the second embodiment are as follows. First, the heating grid 12 is printed on the film 30, the latter of which may be an optical polycarbonate film, a weather resistant film (i.e. PC/PMMA) or another film that is suitable for FIM and has good adhesion to the material of which the substrate is to be formed (preferably PC). The film 30, is shaped and trimmed (if desired), and then positioned in one mold half 44 of the mold 41, being secured to a correspondingly shaped surface of the cavity defined in the mold half 44. It is believed that a rotary or shuttle table type of injection molding machine is best suited for use the present method in that these machines offer greater flexibility and productivity and will allow the use of robotic operators to load the connector inserts 54 into the mold half 42 (core side) and to unload the formed panels 14. With the film 30 located in the mold half 44, or prior thereto, the connector inserts 54 are mounted in retaining features 55 in their respective mold half 42. The connector inserts 54 may be of any variety suited for further attachment to the electrical system of the vehicle and are preferably include internal threads for attachment to the electrical system of the vehicle. Illustratively, the connector inserts 54 may be one-quarter inch electrical connectors of the type often used in the automotive field. Representative examples of such connectors are generally illustrated in FIG. 5.

In performing the process, a robotic arm preferably picks up a film 30 from a feed magazine and places the film 30 onto the corresponding surface of the mold half 44. Preferably, the film 30 is retained on the mold surface by means of electrostatic charging, a mechanical method, or application of a vacuum. Another robotic arm preferably picks up one or more connector inserts 54 from another feed and positions them in the retaining features 55 of their respective mold half 42, generally opposite of the film 30. The retaining features 55 of the mold half 42 may be mechanical, magnetic or other means which secure and retain the connector insert 54 with the mold tool 42. Loaded as such, the mold 41 closes and the plastic resin is injected between the film 30 and the mold half 42, partially enveloping or encapsulating the insert 54 and hot melt bonding the film 30 and the substrate 24. By partially encapsulating the connector inserts 54, a mechanical attachment is formed between the substrate 24 and the connector insert 54, either by the shrinking of the encapsulating resin around the insert 54 as the resin cools or by interlocking the resin with surface irregularities in the insert 54. The injected resin then cools, and solidifies; resulting in a panel 14 with the encapsulated heating grid 12, as well as the molded-in connector inserts 54. After molding, the panel 14 is ejected or removed, preferably by a robotic arm, and the next molding cycle begins anew.

In a variation of the prior embodiment, seen in FIGS. 6A-6F, one or more pad connectors 56 are secured to the busbars 18, 19 of the film 30 prior to incorporation of the film 30 into the panel 14. Preferably, the surface of the pad connector 56 contacting the busbars 18, 19 is knurled for better electrical contact with the busbars 18, 19. During FIM, the plastic resin forming the substrate 24 will encapsulate not only the heating grid 12 provided on the film 30, but also the pad connectors 56. (See FIG. 6C) After removal from the mold, the portion of the substrate 24 located immediately above the pad connectors 56 is removed to define a bore 57 and expose a central portion of the pad connectors 56. (See FIG. 6D) Preferably, the thickness of the pad conductors 56 is sufficiently great so as to reduce the risk of machining through the pad conductors 56 and into the busbars 18, 19 when the portion of the substrate 24 located thereabove is removed. Also, preferably, the diameter or width of the connector pad 56 is greater than the area removed from the substrate 24. In this way, the substrate 24 continues to encapsulate at least a portion of the pad connectors 56, providing higher strength for retaining the pad connectors 56 on the busbars 18, 19 than if the pad connectors 56 had just otherwise secured to the busbars 18, 19.

Figure 6:
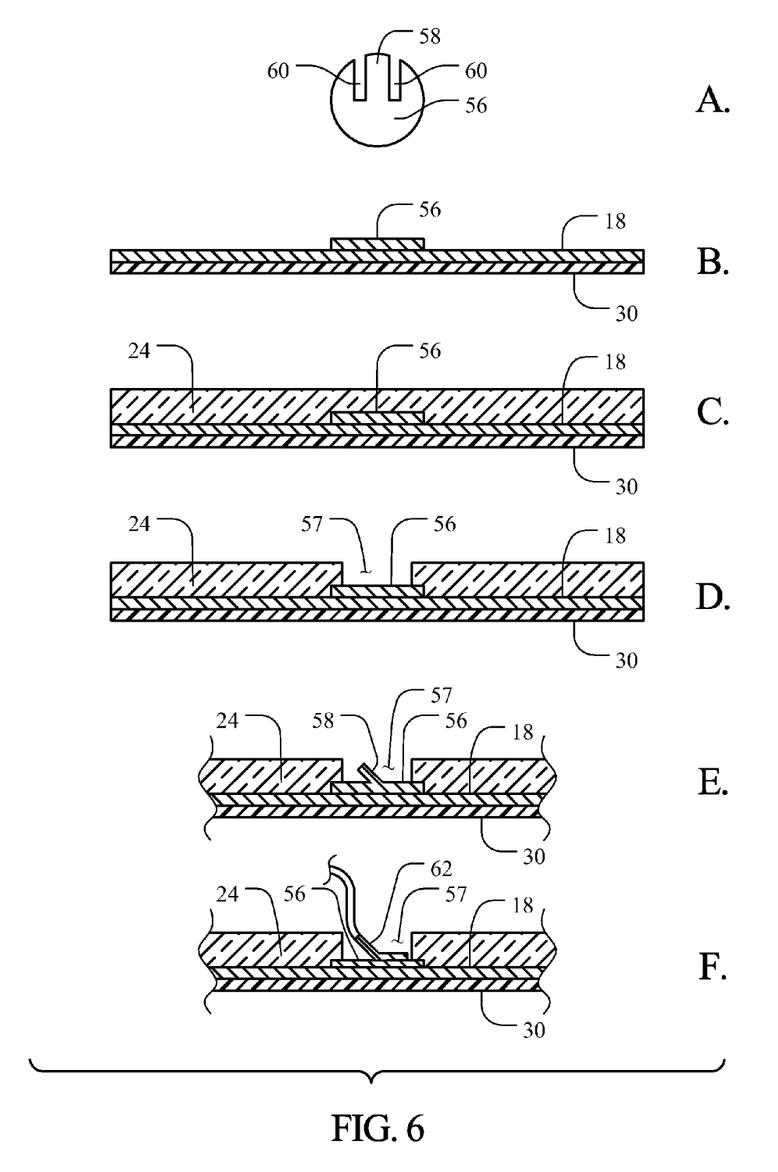
FIGS. 6A-6F illustrate another method and plastic window embodying the principles of the present invention.

The pad connectors 56 can also incorporate features facilitating mechanical connection to the terminals of the vehicle's electrical system wiring harness. For example, as seen in FIG. 6A, a spade 58 may be defined by slots 60 in the pad connectors 56. Upon exposing of the pad connector 56, the spade 58 may then be bent upwardly, as generally seen in FIG. 6E, and the terminal of the wiring harness (not shown) secured thereto. Alternatively and without the spade 58, the terminal of the wiring harness 62 may be bonded to the pad connector 56 as generally seen in FIG. 6F.

The preceding description of the preferred embodiment is merely exemplary in nature and is in no way intended to limit the invention or its application or uses. As person skilled in the art will recognize from the previous description, modifications and changes can be made to the preferred embodiments of the invention without departing from the scope of the invention as defined in the following claims.

What is claimed is:

1. A plastic window comprising:
   a transparent plastic substrate having first and second sides;
   a plastic film, the film being thinner than the substrate and bonded to the first side of the substrate;
   an electrically conductive grid including a conductive connector location, the conductive grid being encapsulated between the substrate and the film;
   and
   an electrical connector, the electrical connector extending into the substrate from the second side of the substrate and being in electrical contact with the conductive connector location whereby an electrical voltage supply can be connected to the conductive connector location and whereby an electrical current caused to flow through the conductive grid.

2. The plastic window of claim 1 wherein the bond between the substrate and the film is a melt bond.

3. The plastic window of claim 1 wherein the electrical connector extends in a bore formed in the substrate.

4. The plastic window of claim 3 wherein the electrical connector is in contact with portions of the substrate defining the bore.

5. The plastic window of claim 3 wherein the electrical connector is not in contact with portion of the substrate defining the bore.

6. The plastic window of claim 3 where in the electrical connector is in threaded engagement with the bore.

7. The plastic window of claim 1 wherein the electrical connector is at least partially encapsulated by the substrate and mechanically retained therein.

8. The plastic window of claim 1 wherein the conductive grid is one of an antenna, an electroluminescent border, an electrical switch, a heating grid and chromogenic device.

9. The plastic window of claim 1 wherein the electrical connector is a threaded metal insert molded into the plastic substrate and being in contact with the conductive connector location.

10. The plastic window of claim 1 wherein the electrical connector is a threaded metal insert, inserted into a bore in the plastic substrate after molding, and being in contact with the conductive connector location.

11. The plastic window of claim 1 wherein the electrical connector is a metal disc attached to the conductive connector location, the disc being partially exposed through an opening in the substrate.

12. The plastic window of claim 11 wherein the disc includes an electric terminal mounting feature.

13. The plastic window of claim 12 wherein the mounting feature is a bent tab defined in the disc.

14. The plastic window of claim 12 wherein the bottom surface of the disc in contact with the conductive connector location has a knurled surface.

15. The plastic window of claim 1 further comprising a protective coating applied to the substrate and film, the protective coating system comprises at least one of a weather resistant layer and an abrasion resistant layer.

16. The plastic window of claim 1 wherein the film is a thin plastic sheet.

* * * * *